UNITED STATES PATENT OFFICE.

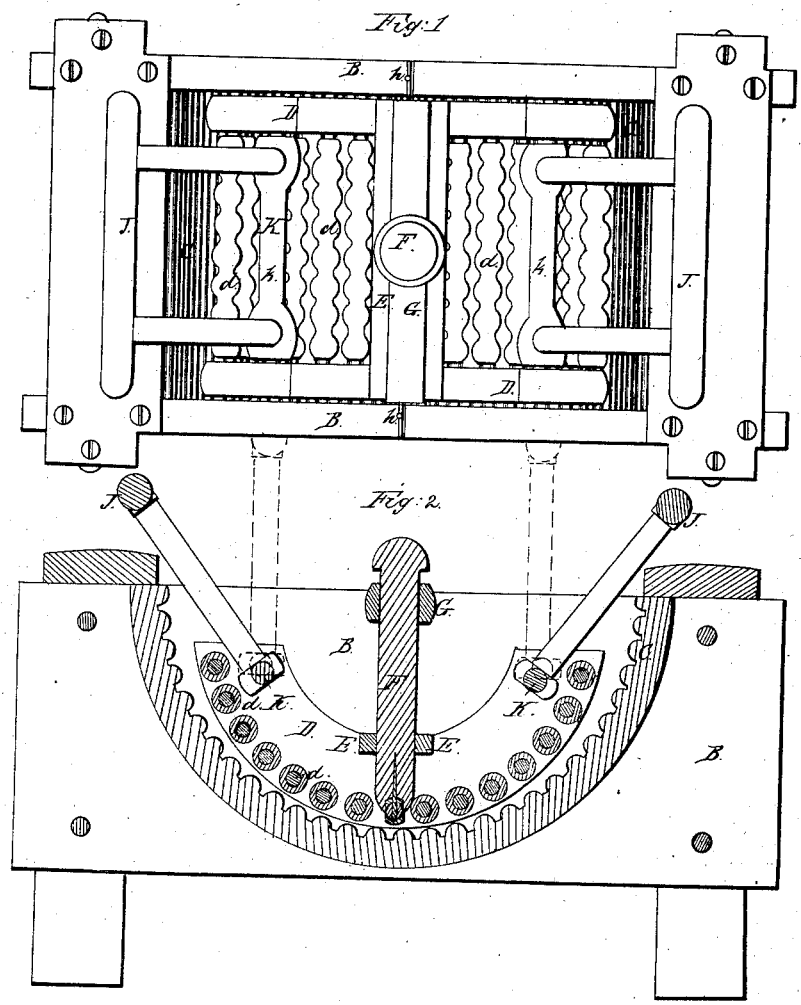

W. T. ARMSTRONG, OF SANDWICH, ILLINOIS.

WASHING-MACHINE.

Specification of Letters Patent No. 21,477, dated September 14, 1858.

*To all whom it may concern:*

Be it known that I, W. T. ARMSTRONG, of Sandwich, in the county of Dekalb and State of Illinois, have invented certain new and useful Improvements in Washing-Machines, the construction and operation of which I have described in the following specification and illustrated in the accompanying drawings with sufficient clearness to enable competent and skilful workmen in the arts to which it pertains or is most nearly allied to make and use my invention.

My invention consists in making the yoke or shaft which supports the rubber in bearings, stationary while in operation so far as vertical motion is concerned, and allowing the necessary vertical play to accommodate the thickness of the mass of clothes which are being operated upon, by means of a slide attached to said rubber and passing through said yoke, being guided by it in such a manner as to allow the rubber to rise or fall without interfering with the position or action of the bearings of the shaft, as hereinafter described.

In the accompanying drawings—Figure 1 is a plan of my improved machine. Fig. 2 is a sectional longitudinal elevation.

A, A, are the legs upon which it is supported.

B, B, are the sides.

C is the concave made semicircular or nearly so.

D, D, are the heads in which the corrugated rollers $d$ which operate upon the cloth are hung. These heads D are connected by the bar E, as well as by the rollers $d$, though the latter being loose do not afford them much support. The central slide F is allowed to slide freely through the bearing shaft G in which the journals are secured at the ends. These journals are fastened in position, when it is to operate, by the pins $h$.

J, J, are arms or handles hinged to the heads D, D, by means of the shafts $k$, $k$, by which arrangement these arms are allowed to be turned into a vertical position for operating the rubber by downward pressure upon them, as shown in red lines in Fig. 2, or may be folded in, out of the way upon the shaft G and slide F. This arrangement furnishes a convenient means for operating the rubber by alternate downward motion of the handles J, which is more convenient than the old vibratory and downward motion by which the same thing has usually been done.

By hanging the slide F in a shaft that is so fixed in its bearings that it cannot rise or fall, and allowing the said slide to pass freely through it as described, a more satisfactory motion of the rubber is obtained, and it is more easily operated.

The particular improvement which constitutes my said invention, and which I claim as having been originally and first invented by me, is—

The combination of the rubber and the slide F with the stationary shaft G, substantially as and for the purposes set forth.

W. T. ARMSTRONG.

Witnesses:
ROBT. PATTENS,
JOHN ARMSTRONG.